(12) United States Patent
Xiang et al.

(10) Patent No.: US 12,324,510 B2
(45) Date of Patent: Jun. 10, 2025

(54) CEILING STORAGE RACK

(71) Applicant: LOCTEK ERGONOMIC TECHNOLOGY CORP., Zhejiang (CN)

(72) Inventors: Lehong Xiang, Zhejiang (CN); Tongwang Shao, Zhejiang (CN); He Wang, Zhejiang (CN)

(73) Assignee: LOCTEK ERGONOMIC TECHNOLOGY CORP., Ningbo (CN)

( * ) Notice: Subject to any disclaimer, the term of this patent is extended or adjusted under 35 U.S.C. 154(b) by 0 days.

(21) Appl. No.: 18/608,818

(22) Filed: Mar. 18, 2024

(65) Prior Publication Data

US 2024/0215715 A1 Jul. 4, 2024

(30) Foreign Application Priority Data

Jun. 30, 2023 (CN) .......................... 202310802267.1

(51) Int. Cl.
| | |
|---|---|
| *A47B 45/00* | (2006.01) |
| *A47B 51/00* | (2006.01) |
| *A47F 5/08* | (2006.01) |
| *F16M 13/02* | (2006.01) |
| *H02K 7/116* | (2006.01) |
| *H02K 7/14* | (2006.01) |

(52) U.S. Cl.
CPC ............ *A47B 45/00* (2013.01); *A47F 5/0892* (2013.01); *F16M 13/027* (2013.01); *H02K 7/116* (2013.01); *H02K 7/14* (2013.01); *A47B 2051/005* (2013.01)

(58) Field of Classification Search
CPC ..... A47B 45/00; A47B 43/003; A47B 43/006; A47B 51/00; A47B 63/067; A47B 2051/005; A47F 3/11; A47F 5/025; A47F 5/0892; F16M 13/027; H02K 7/116; H02K 7/14
USPC ................ 211/1.57, 117, 1.51; 254/4 R, 4 C
See application file for complete search history.

(56) References Cited

U.S. PATENT DOCUMENTS

| | | | | |
|---|---|---|---|---|
| 493,596 | A | * 3/1893 | McLeran | A47B 46/005 211/117 |
| 787,277 | A | * 4/1905 | Carter | B66D 3/06 211/117 |
| 1,066,371 | A | * 7/1913 | Bosworth | A47F 5/0892 211/117 |
| 1,202,166 | A | * 10/1916 | Corbett | A47F 5/0892 211/117 |
| 2,643,662 | A | * 6/1953 | Bunce | B65D 83/768 254/338 |
| 3,661,415 | A | * 5/1972 | Piasecki | B66C 1/10 294/81.1 |

(Continued)

*Primary Examiner* — Jennifer E. Novosad
(74) *Attorney, Agent, or Firm* — Bayramoglu Law Offices LLC (57) ABSTRACT

A ceiling storage rack comprises a rotary shaft, a drive mechanism driving the rotation of the rotary shaft, two pulleys, a placement platform, a first wire group and a second wire group. The rotary shaft is rotatably connected at a side of a ceiling fixing assembly. Two winding portions rotating in synchronization with the rotary shaft are disposed at both sides of the rotary shaft: a first winding portion and a second winding portion. The ceiling storage rack capable of preventing a placement platform from falling down, increasing safety level and avoiding dislocation and entangling of double-strand cables.

10 Claims, 5 Drawing Sheets

(56) References Cited

U.S. PATENT DOCUMENTS

| | | | | | |
|---|---|---|---|---|---|
| 3,872,972 | A | * | 3/1975 | Cummins | B62H 3/12 |
| | | | | | 211/117 |
| 6,241,048 | B1 | * | 6/2001 | Heilmann | B66F 7/02 |
| | | | | | 254/311 |
| 7,325,785 | B2 | * | 2/2008 | Krengel | A47F 5/0892 |
| | | | | | 254/338 |
| 7,527,242 | B2 | * | 5/2009 | Shaha | E04H 6/42 |
| | | | | | 254/338 |
| 7,575,098 | B2 | * | 8/2009 | Hartley | B66B 9/00 |
| | | | | | 248/330.1 |
| 7,631,854 | B1 | * | 12/2009 | Mountain | B62H 3/12 |
| | | | | | 254/390 |
| 8,544,823 | B2 | * | 10/2013 | Imberi | B66D 1/12 |
| | | | | | 254/338 |
| 9,737,140 | B2 | * | 8/2017 | Bondi | A47B 43/006 |
| 2006/0238085 | A1 | * | 10/2006 | Greenberg | A47B 51/00 |
| | | | | | 312/306 |
| 2012/0000865 | A1 | * | 1/2012 | Cangialosi | D06F 57/125 |
| | | | | | 211/1.57 |
| 2015/0272323 | A1 | * | 10/2015 | Klooth | A47B 96/07 |
| | | | | | 182/144 |
| 2018/0180233 | A1 | | 6/2018 | Mellor et al. | |
| 2021/0039883 | A1 | | 2/2021 | Hall et al. | |
| 2024/0051753 | A1 | | 2/2024 | Miller | |
| 2024/0215715 | A1 | * | 7/2024 | Xiang | F16M 13/027 |

* cited by examiner

CEILING STORAGE RACK

TECHNICAL FIELD

The present invention relates to the technical field of the garage storage racks and specifically pertains to a ceiling storage rack.

BACKGROUND

The storage racks are used to place or hold articles and can be widely applied to ordinary families, office sites, storage rooms and garages and the like. The garage storage racks in the prior arts comprise many types such as ceiling-hung storage rack and wall-mounted rack and the like. The wall-mounted rack is usually mounted on a wall, and its structure usually comprises a connection frame connected with a wall and a placement platform, where the placement platform is fixedly connected with the connection frame and people can place articles on the placement platform. The placement platform of the wall-mounted storage rack with this structure cannot be adjusted in height, bringing much inconvenience to the placement or storage of the articles. Further, indoor space cannot be reasonably utilized.

At present, there appear some ceiling garage racks which are adjusted in height and mounted on the ceiling for use, as in the prior application of the applicant of the present disclosure. The prior application with the publication number CN213154855U and the title of garage ceiling storage rack discloses a structure comprising a fixing piece connected with a ceiling and a placement platform below the fixing piece, and further comprising a rotary shaft rotatably connected at a side of the fixing piece, wherein two wire winding portions are disposed at both sides of the rotary shaft; the garage ceiling storage rack further comprises two cables which are correspondingly wound on two wire winding portions and each cable has one single-strand cable; the rotation of the wire winding portions brings the single-strand cables to be wound, and in this winding process, one segment of cable of the single-strand cables always squeezes, along an axial direction of the wire winding portions on the wire winding portions, the other segment of cable while performing parallel regular winding, so as to lift the placement platform. In some other ceiling storage racks of the related arts, in order to increase the bearing capacity of the placement platform, the single-strand cable of each cable is replaced with a double-strand parallel cable to increase the bearing capacity of the placement platform.

In the practical uses, the garage ceiling storage rack in the related arts has the following shortcomings: in the ceiling storage rack with each cable using a single-strand cable, when the wire winding portions winds under overload or the cable ages due to a long time of use, if the single-strand cable of each cable breaks, the placement platform will fall down, leading to lower safety. But, in the ceiling storage rack with each cable using two double-strand parallel cables, when the double-strand parallel cables are wound on the wire winding portions, it is easy to cause the double-strand cables to be knotted or cross-dislocated on the wire winding portions and so on due to the factors such as uneven stress and mounting error and the like, thereby causing the placement platform to be tilted.

SUMMARY

In order to solve the above defects in the prior arts, the present invention provides a ceiling storage rack capable of preventing a placement platform from falling down, increasing safety level and avoiding dislocation and entangling of double-strand cables.

The present invention provides the following technical solution: a ceiling storage rack with the following structure, which comprises:

a rotary shaft rotatably connected at a side of a ceiling fixing assembly and a drive mechanism driving the rotation of the rotary shaft, and two winding portions rotating in synchronization with the rotary shaft are disposed at both sides of the rotary shaft: a first winding portion and a second winding portion;

two pulleys: a first pulley and a second pulley, and the two pulleys are connected at another side of the ceiling fixing assembly and respectively disposed corresponding to the two winding portions;

a placement platform, disposed below the ceiling fixing assembly;

a first wire group, comprising a first winding wire and a second winding wire, and the first winding wire is connected with a first connection point of the first winding portion; a first end of the first winding wire is connected with the placement platform, and a second end of the first winding wire runs over the first pulley and then is connected with the placement platform; the second winding wire is connected with a second connection point of the first winding portion; a first end of the second winding wire is connected with the placement platform, and a second end of the second winding wire runs over the first pulley and then is connected with the placement platform;

the first connection point and the second connection point are respectively located at both ends of the first winding portion to enable the first winding wire and the second winding wire to be simultaneously wound toward a center of the first winding portion or unwound from the center of the first winding portion toward both ends;

a second wire group, comprising a third winding wire and a fourth winding wire, and the third winding wire is connected with a third connection point of the second winding portion; a first end of the third winding wire is connected with the placement platform, and a second end of the third winding wire runs over the second pulley and then is connected with the placement platform; the fourth winding wire is connected with a fourth connection point of the second winding portion; a first end of the fourth winding wire is connected with the placement platform, and a second end of the fourth winding wire runs over the second pulley and then is connected with the placement platform;

the third connection point and the fourth connection point are respectively located at both ends of the second winding portion to enable the third winding wire and the fourth winding wire to be simultaneously wound toward a center of the second winding portion or unwound from the center of the second winding portion toward both ends.

In some embodiments, there is a length difference between the first winding wire and the second winding wire of the first wire group and between the third winding wire and the fourth winding wire of the second wire group, so as to enable one of each of the two wire groups to provide a lifting capacity to the placement platform.

In some embodiments, the length difference is set to D and the value range of the D is 10 mm≤D≤30 mm.

In some embodiments, the length difference is 20 mm.

In some embodiments, a first fixing buckle and a second fixing buckle are symmetrically connected at both ends of the first winding portion respectively. The first fixing buckle has a first receiving portion. The first winding wire is pre-wound at least one turn of first winding segment along a winding direction on the first winding portion. The first winding segment is received in the first receiving portion, and the first receiving portion forms the first connection point. The second fixing buckle has a second receiving portion. The second winding wire is pre-wound at least one turn of second winding segment along the winding direction on the first winding portion. The second winding segment is received in the second receiving portion and the second receiving portion forms the second connection point.

A third fixing buckle and a fourth fixing buckle are symmetrically connected at both ends of the second winding portion respectively. The third fixing buckle has a third receiving portion. The third winding wire is pre-wound at least one turn of third winding segment along the winding direction on the second winding portion. The third winding segment is received in the third receiving portion and the third receiving portion forms the third connection point. The fourth fixing buckle has a fourth receiving portion. The fourth winding wire is pre-wound at least one turn of fourth winding segment along the winding direction on the second winding portion. The fourth winding segment is received in the fourth receiving portion, and the fourth receiving portion forms the fourth connection point.

In some embodiments, a first positioning structure is disposed respectively at both ends of the first winding portion, and a second positioning structure in insertion cooperation with the first positioning structure at both ends of the first winding portion is respectively disposed on an inner wall of the first fixing buckle and the second fixing buckle. The insertion cooperation of the first positioning structure and the second positioning structure aims to limit the first fixing buckle and the second fixing buckle from circumferentially rotating relative to the first winding portion. A third positioning structure is respectively disposed at both ends of the second winding portion, and a fourth positioning structure in insertion cooperation with the third positioning structure at both ends of the second winding portion is respectively disposed on an inner wall of the third fixing buckle and the fourth fixing buckle. The insertion cooperation of the third positioning structure and the fourth positioning structure aims to limit the third fixing buckle and the fourth fixing buckle from circumferentially rotating relative to the second winding portion.

In some embodiments, the connection point of the first winding wire and the second winding wire with a side of the placement platform close to the rotary shaft is located in the middle position of the first winding portion; the connection point of the third winding wire and the fourth winding wire with a side of the placement platform close to the rotary shaft is located in the middle position of the second winding portion.

In some embodiments, the first pulley is located in a vertical plane of a center of a connection line of the first connection point and the second connection point of the first winding portion, and the second pulley is located in a vertical plane of a center of a connection line of the third connection point and the fourth connection point of the second winding portion.

In some embodiments, the ceiling fixing assembly comprises two mounting frames respectively connected to a ceiling and the two mounting frames are respectively located at a side close to the rotary shaft. An insertion groove is disposed on the two mounting frames respectively and both ends of the rotary shaft are connected with two insertion blocks. The two insertion blocks are respectively and correspondingly inserted into the insertion grooves of the two mounting frames.

In some embodiments, the drive mechanism is a drive gearbox connected at an end of the rotary shaft. A power output end of the drive gearbox is in transmission connection with the rotary shaft and an input end of the drive gearbox is connected with a drive handle extending downward.

In conclusion, compared with the prior arts, the ceiling storage rack of the present disclosure has the following advantages: each wire group of the ceiling storage rack comprises two winding wires, and when the rotary shaft drives the two winding portions to wind or unwind, the two winding wires of each wire group is wound or unwound on the corresponding winding portion. Therefore, even if one winding wire breaks, the other winding wire can provide a lifting capacity to the placement platform, so as to prevent the placement platform from falling down and increase the safety level. Furthermore, two winding wires are respectively connected to two connection points of the winding portion, and the two connection points of the winding portion are located respectively at both ends of the winding portion, namely, the two winding wires are separately disposed; further, there is a space for two winding wires to wind simultaneously between the connection positions of the two winding wires with the winding portion. When the rotary shaft drives the winding portions to wind, two winding wires of each wire group inwardly perform parallel regular winding along an axial direction of the winding portion, without mutual interference. Therefore, the double-strand winding wires on one winding portion are prevented from being crossed or entangled and thus the placement platform can be lifted more stably and can be always maintained in horizontal state.

Numerals of drawings are described below:

1. rotary shaft, 100. first winding portion, 101. second winding portion, 102. insertion block, 2. first pulley, 200. second pulley, 3. placement platform, 4. ceiling fixing assembly, 400. mounting frame, 5. first wire group, 500. first winding wire, 501. second winding wire, 502. first winding segment, 503. second winding segment, 6. second wire group, 600. third winding wire, 601. fourth winding wire, 602. third winding segment, 603. fourth winding segment, 7.

first fixing buckle, 700. second fixing buckle, 701. third fixing buckle, 702. fourth fixing buckle, 703. extending block, 704. second receiving portion, 705. second positioning structure, 8. first connection point, 800. second connection point, 801. third connection point, 802. fourth connection point, 9. drive mechanism, 900. drive handle.

DETAILED DESCRIPTIONS OF EMBODIMENTS

Firstly, those skilled in the arts should understand that these embodiments are used only to interpret the technical principle of the embodiments of the present disclosure rather than limit the scope of protection of the embodiments of the present disclosure. Those skilled in the arts can make adjustment thereto to adapt to the specific application scenarios.

In the descriptions of the embodiments of the present disclosure, it should be noted that, unless otherwise clearly stated or defined, the terms "connect" and "couple", and the like shall be understood in a broad sense, for example, may be fixed connection, or detachable connection, or formed into one piece; or may be mechanical connection, or electrical connection; or direct connection or indirect connection through an intermediate medium. Those skilled in the art may understand the specific meanings of the above terms in the present disclosure according to actual situations.

In the embodiments of the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Detailed descriptions are made below on the present disclosure in combination with drawings and specific embodiments.

As shown in FIGS. 1 to 5:

An embodiment of the present disclosure provides a ceiling storage rack, which is usually mounted on a ceiling of a warehouse, a garage and a storage room and the like for the purpose of article storage. The structure of the ceiling storage rack comprises a rotary shaft 1, a drive mechanism 9 driving the rotation of the rotary shaft 1, two pulleys and a placement platform 3. The rotary shaft 1 is rotatably connected at a side of a ceiling fixing assembly 4. Two winding portions rotating in synchronization with the rotary shaft 1 are disposed at both sides of the rotary shaft 1: a first winding portion 100 and a second winding portion 101. Specifically, in this embodiment, the rotary shaft 1 comprises a first shaft located in middle, and a second shaft and a third shaft located in both ends of the first shaft. The first shaft, the second shaft and the third shaft are disposed on a same axis, and both ends of the first shaft are penetrated respectively into center holes of the second shaft and the third shaft and adjustable in position and thus the overall length of the rotary shaft 1 is made adjustable. The first winding portion 100 and the second winding portion 101 are formed on outer surfaces of the second shaft and the third shaft. Two pulleys are connected at another side of the ceiling fixing assembly 4, where the two pulleys are a first pulley 2 and a second pulley 200. The two pulleys are connected at another side of the ceiling fixing assembly 4 and disposed corresponding to the two winding portions respectively. The placement platform 3 is disposed and maintained in a horizontal state for article storage under the ceiling fixing assembly 4. The placement platform 3 is usually a square grid plate and thus has a small deadweight. Four connection holes connected with wire groups are disposed at four corners of the placement platform 3.

In this embodiment, in order to help mount the ceiling storage rack, the ceiling fixing assembly 4 comprises two mounting frames 400 respectively connected to a ceiling and the two mounting frames 400 are respectively located at a side close to the rotary shaft 1. An insertion groove is disposed on the two mounting frames 400 respectively and both ends of the rotary shaft 1 are connected with two insertion blocks 102. The two insertion blocks 102 are respectively and correspondingly inserted into the insertion grooves of the two mounting frames 400. The rotary shaft 1 can perform circumferential movement relative to the two insertion blocks 102. During mounting process, it is only required to insert the insertion blocks on the rotary shaft 1 correspondingly into the insertion grooves of the mounting frames 400 and then connect them with fasteners, resulting in simple operation and convenient mounting.

Figure 1:
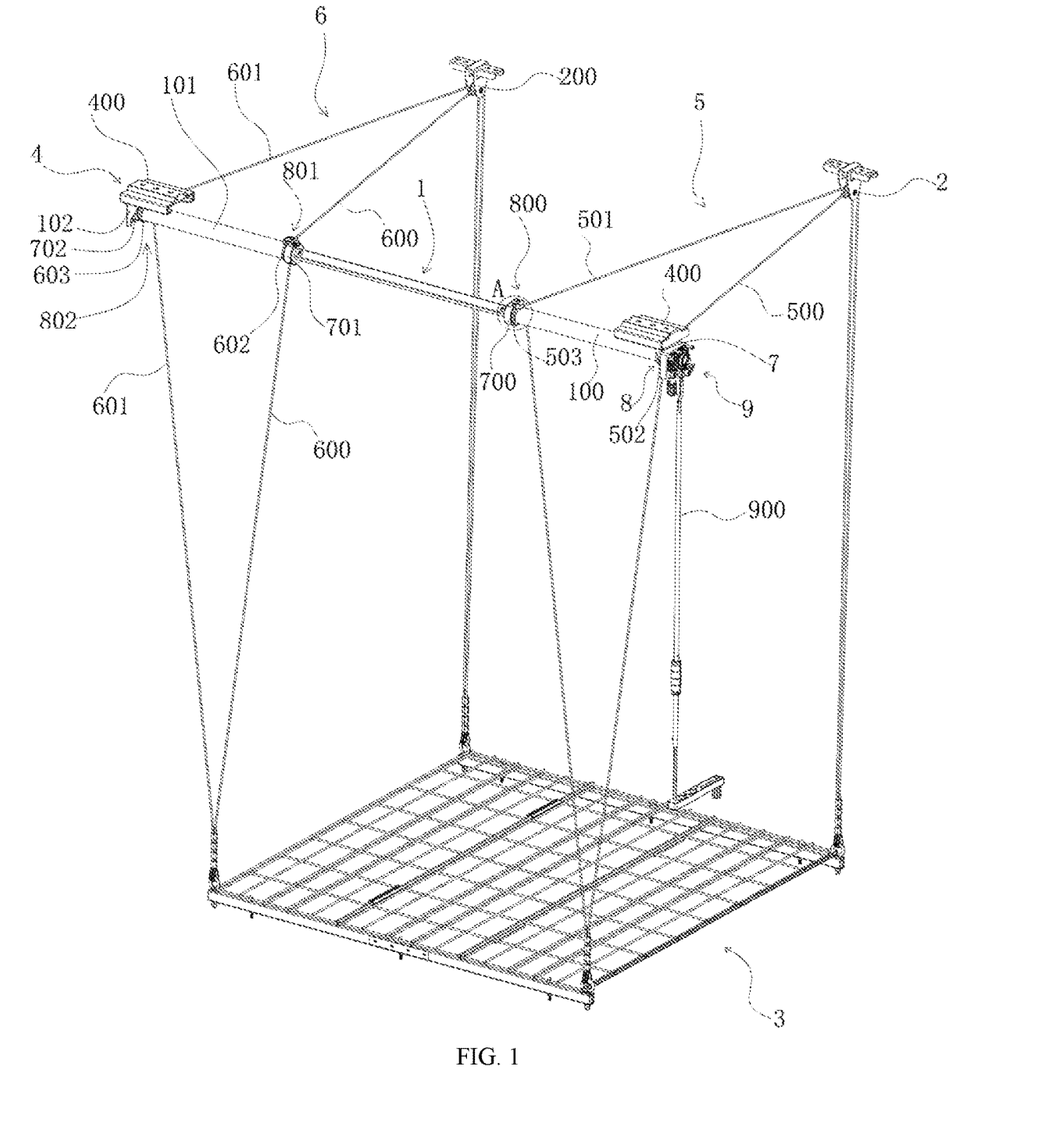
FIG. 1 is a structural schematic diagram illustrating a ceiling storage rack according to some embodiments of the present disclosure.
Figure 2:
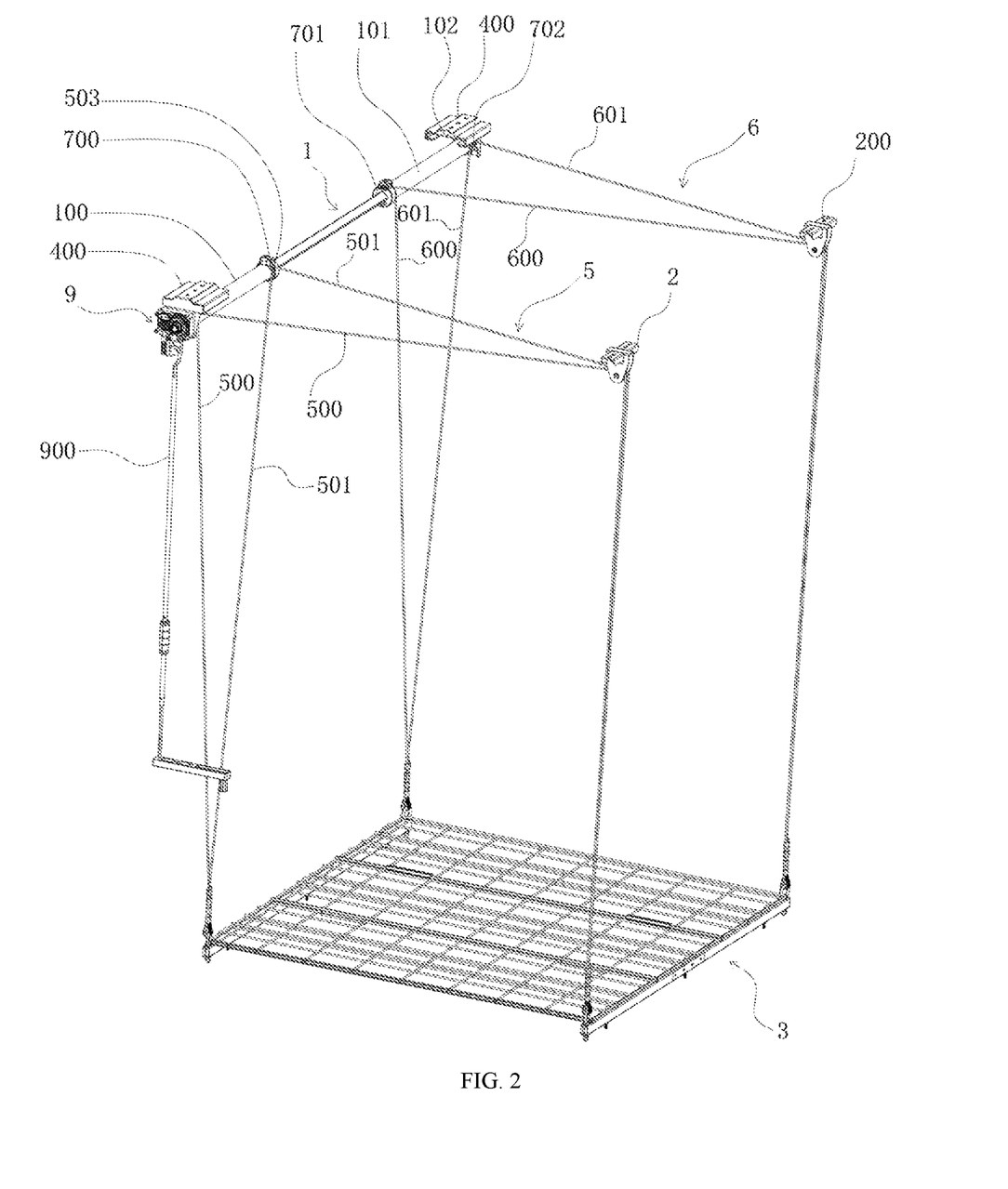
FIG. 2 is a structural schematic diagram illustrating a ceiling storage rack at another angle according to some embodiments of the present disclosure.

In this embodiment, as shown in FIGS. 1 and 2, the ceiling storage rack further comprises two wire groups: a first wire group 5 and a second wire group 6. The first wire group 5 comprises a first winding wire 500 and a second winding wire 501. The first winding wire 500 is connected with a first connection point 8 of the first winding portion 100, a first end of the first winding wire 500 is connected with the placement platform 3 under the rotary shaft 1, and a second end of the first winding wire 500 runs over the first pulley 2 and then is connected with the placement platform 3 under the first pulley 2. The second winding wire 501 is connected with a second connection point 800 of the first winding portion 100, a first end of the second winding wire 501 is connected with the placement platform 3 under the rotary shaft 1, and a second end of the second winding wire 501 runs over the first pulley 2 and then is connected with the placement platform 3 under the first pulley 2. The first connection point 8 and the second connection point 800 of the first winding portion 100 are respectively located at both ends of the first winding portion 100 such that the first winding wire 500 and the second winding wire 501 are simultaneously wound toward the center of the first winding portion 100 or unwound from the center of the first winding portion 100 toward both ends. The second wire group 6 comprises a third winding wire 600 and a fourth winding wire 601. The third winding wire 600 is connected with a third connection point 801 of the second winding portion 101, a first end of the third winding wire 600 is connected with the placement platform 3 under the rotary shaft 1, and a second end of the third winding wire 600 runs over the second pulley 200 and then is connected with the placement platform 3 under the second pulley 200. The fourth winding wire 601 is connected with a fourth connection point 802 of the second winding portion 101, a first end of the fourth winding wire 601 is connected with the placement platform 3 under the rotary shaft 1, and a second end of the fourth winding wire 601 runs over the second pulley 200 and then is connected with the placement platform 3 under the second pulley 200. The third connection point 801 and the fourth connection point 802 are respectively located at both ends of the second winding portion 101, such that the third winding wire 600 and the fourth winding wire 601 are simultaneously wound toward the center of the second winding portion 101 or unwound from the center of the second winding portion 101 toward both ends.

In this embodiment, the rotary shaft 1 rotates to drive the two winding portions: the first winding portion 100 and the second winding portion 101 to synchronously rotate, the first winding wire 500 and the second winding wire 501 of the first wire group 5 are wound close to each other or unwound away from each other on the first winding portion 100, and the third winding wire 600 and the fourth winding wire 601 of the second wire group 6 are wound close to each other or unwound away from each other on the second winding portion 101. Therefore, when one of the winding wires of any wire group breaks, the other winding wire can provide a bearing capacity to the placement platform 3, so as to prevent the placement platform 3 from falling down and increase the safety level. Furthermore, two winding wires are respectively connected to two connection points of the winding portion, and the two connection points of the winding portion are located respectively at both ends of the winding portion, namely, the two winding wires are separately disposed; further, there is a space for two winding wires to wind simultaneously between the connection positions of the two winding wires with the winding portion. When the rotary shaft 1 drives the winding portions to wind, one winding wire of each wire group inwardly performs parallel regular winding along an axial direction of the winding portion, and the other winding wire also inwardly performs parallel regular winding along the axial direction of the winding portion; or, when the rotary shaft 1 rotates to drive the winding portions to unwind, one winding wire of each wire group outwardly performs parallel regular unwinding along the axial direction of the winding portion, and the other winding wire also outwardly performs parallel regular unwinding along the axial direction of the winding portion. In this case, the two winding wires of each wire group can be wound or unwound without mutual interference. This way, the double-strand winding wires on one winding portion are prevented from being crossed or entangled and thus the placement platform 3 can be lifted more stably and can be always maintained in horizontal state.

With further reference to FIG. 1, in some embodiments, there is a length difference between the first winding wire 500 and the second winding wire 501 of the first wire group 5 and between the third winding wire 600 and the fourth winding wire 601 of the second wire group 6, and this length difference is set to enable one winding wire of each of the two wire groups to provide a lifting capacity to the placement platform 3. In this case, in each wire group, one winding wire provides a lifting capacity to the placement platform 3 while the other one is in a standby state. When one winding wire providing a lifting capacity breaks, the other standby winding wire can provide a lifting capacity to the placement platform 3 in time. Therefore, for the ceiling storage rack, even if one winding wire breaks, the other winding wire can still provide a lifting capacity to the placement platform 3, so as to effectively prevent the placement platform 3 from falling down and increase the safety level.

It can be easily understood that in this embodiment, in order to enable the placement platform 3 to be in a horizontal state, the length of the first winding wire 500 of the first wire group 5 is equal to the length of the fourth winding wire 601 of the second wire group 6, and the length of the second winding wire 501 of the first wire group 5 is equal to the length of third winding wire 600 of the second wire group 6; there is a length difference between the first winding wire 500 and the second winding wire 501, and there is a length difference between the third winding wire 600 and the fourth winding wire 601. Furthermore, in this embodiment, the length difference between the first winding wire 500 and the second winding wire 501 of the first wire group 5 and between the third winding wire 600 and the fourth winding wire 601 of the second wire group 6 is set to D, where the value range of D is 10 mm≤D≤30 mm. In this embodiment, the optimal value of the length difference D is 20 mm.

Taking the first wire group 5 as an example, the length of the first winding wire 500 of the first wire group 5 is greater than the length of the second winding wire 501, namely, the first winding wire 500 is 20 mm longer than the second winding wire 501; or, the length of the first winding wire 500 from the first connection point 8 to the first end of the first winding wire 500 is set to C1, and the length of the first winding wire 500 from the first connection point 8 to the second end of the first winding wire 500 is set to C2; the length of the second winding wire 501 from the second connection point 800 to the first end of the second winding wire 501 is set to C3, and the length of the second winding wire 501 from the second connection point 800 to the second end of the second winding wire 501 is set to C4, namely, (C1+C2)−(C3+C4)=20 mm. Thus, after the first wire group 5 is connected, the first winding wire 500 is entirely in a slightly-loosened standby state, and especially under the action of the deadweight of the placement platform 3, the first winding wire 500 will not be dislocated or cross-entangled due to slight loosening during winding or unwinding. Furthermore, when the length difference is set to 10 mm, in normal state, the first winding wire 500 is at a stressed or unstressed critical point due to mounting error or winding wire thickness or the like. If the length difference is set to less than 10 mm, the first winding wire 500 is at the stressed critical point when actually wound or unwound; if the length difference is set to greater than 30 mm, the first winding wire 500 is easy to loosen and swing when actually wound or unwound, leading to cross entangling and dislocation.

With reference to FIGS. 1 to 5, in some embodiments, a first fixing buckle 7 and a second fixing buckle 700 are symmetrically connected at both ends of the first winding portion 100 respectively. The first fixing buckle 7 has a first receiving portion. The first winding wire 500 is pre-wound at least one turn of first winding segment 502 along a winding direction on the first winding portion 100. The first winding segment 502 is received in the first receiving portion, and the first receiving portion forms the first connection point 8. The second fixing buckle 700 has a second receiving portion 704. The second winding wire 501 is pre-wound at least one turn of second winding segment 503 along the winding direction on the first winding portion 100. The second winding segment 503 is received in the second receiving portion 704 and the second receiving portion 704 forms the second connection point 800. A third fixing buckle 701 and a fourth fixing buckle 702 are symmetrically connected at both ends of the second winding portion 101 respectively. The third fixing buckle 701 has a third receiving portion. The third winding wire 600 is pre-wound at least one turn of third winding segment 602 along the winding direction on the second winding portion 101. The third winding segment 602 is received in the third receiving portion and the third receiving portion forms the third connection point 801. The fourth fixing buckle 702 has a fourth receiving portion. The fourth winding wire 601 is pre-wound at least one turn of fourth winding segment 603 along the winding direction on the second winding portion 101. The fourth winding segment 603 is received in the fourth receiving portion, and the fourth receiving portion forms the fourth connection point 802. In this embodiment, the disposal of the first fixing buckle 7 and the second fixing buckle 700 on the first winding portion 100 not only connects the first winding wire 500 and the second winding wire 501 to the first winding portion 100 but also enables the first winding wire 500 and the second winding wire 501 to form respective winding segments pre-wound along the winding direction on the first winding portion 100 and the third winding wire 600 and the fourth winding wire 601 to form respective winding segments pre-wound along the winding direction on the second winding portion 101. In this case, when the two winding portions perform winding or unwinding, each winding wire can be wound or unwound along the pre-winding direction, avoiding disorderly winding and mutual entangling.

Figure 4:
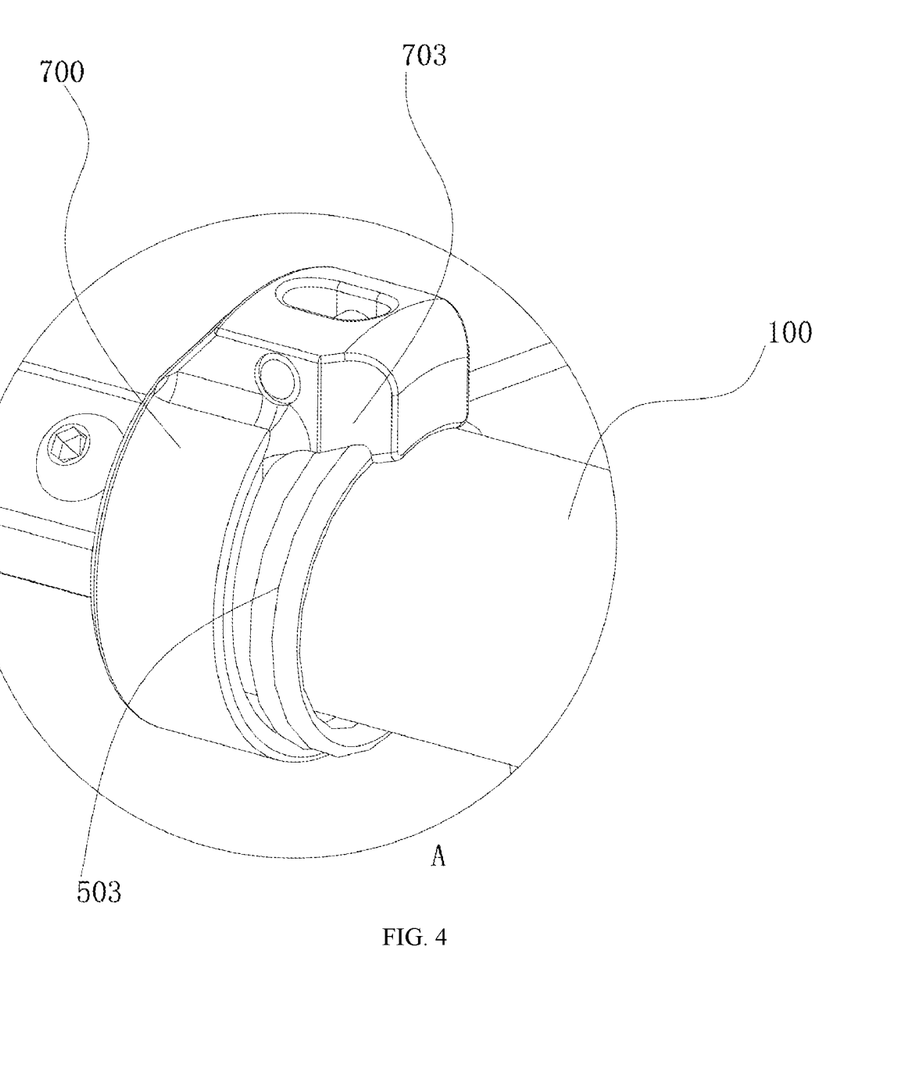
FIG. 4 is a schematic diagram of a partial enlarged structure in FIG. 1.
Figure 5:
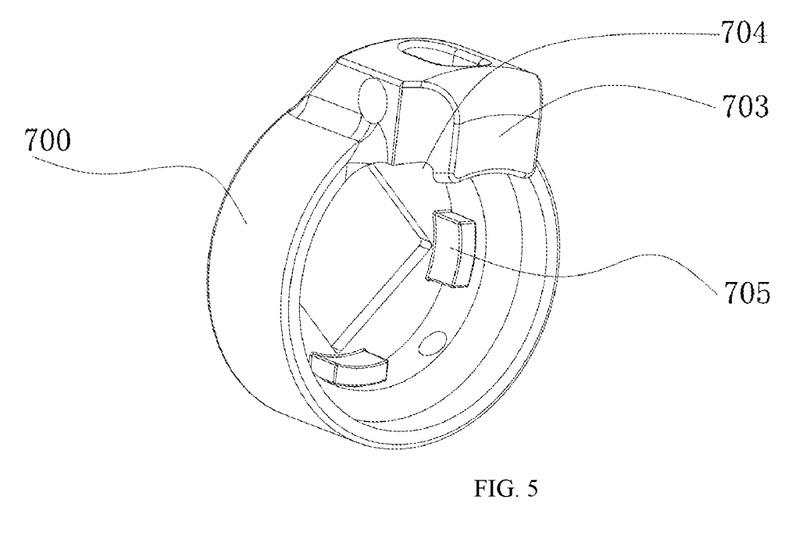
FIG. 5 is a structural schematic diagram illustrating a second fixing buckle of a ceiling storage rack according to some embodiments of the present disclosure.

In this embodiment, the receiving portions of the four fixing buckles refer to that: an extending block 703 extending circumferentially and outwardly is disposed at an end of the corresponding fixing buckle; an inner wall of the extending block 703 is arc-shaped to match a surface of the corresponding winding portion; a receiving space is formed between the extending block 703 and the winding portion, and when the winding segment is received in the space between the extending block 703 and the winding portion, the extending block 703 tightly presses the winding segment.

In some embodiments, a first positioning structure is disposed respectively at both ends of the first winding portion 100, and a second positioning structure 705 in insertion cooperation with the first positioning structure at both ends of the first winding portion 100 is respectively disposed on an inner wall of the first fixing buckle 7 and the second fixing buckle 700. The insertion cooperation of the first positioning structure and the second positioning structure 705 aims to limit the first fixing buckle 7 and the second fixing buckle 700 from circumferentially rotating relative to the first winding portion 100. A third positioning structure is respectively disposed at both ends of the second winding portion 101, and a fourth positioning structure in insertion cooperation with the third positioning structure at both ends of the second winding portion 101 is respectively disposed on an inner wall of the third fixing buckle 701 and the fourth fixing buckle 702. The insertion cooperation of the third positioning structure and the fourth positioning structure aims to limit the third fixing buckle 701 and the fourth fixing buckle 702 from circumferentially rotating relative to the second winding portion 101. Specifically, in this embodiment, as shown in FIGS. 4 and 5, the first positioning structure is an insertion hole disposed at the ends of the first winding portion 100, and the second positioning structure 705 is a positioning block disposed on the inner wall of the first fixing buckle 7 and the second fixing buckle 700 to perform insertion cooperation with the insertion hole. Likewise, the third positioning structure is an insertion hole disposed at the ends of the second winding portion 101, and the fourth positioning structure is a positioning block disposed on the inner wall of the third fixing buckle 701 and the fourth fixing buckle 702 to perform insertion cooperation with the insertion hole. In this embodiment, the first fixing buckle 7, the second fixing buckle 700, the third fixing buckle 701 and the fourth fixing buckle 702 are all fixedly connected to the corresponding winding portions by screws.

Figure 3:
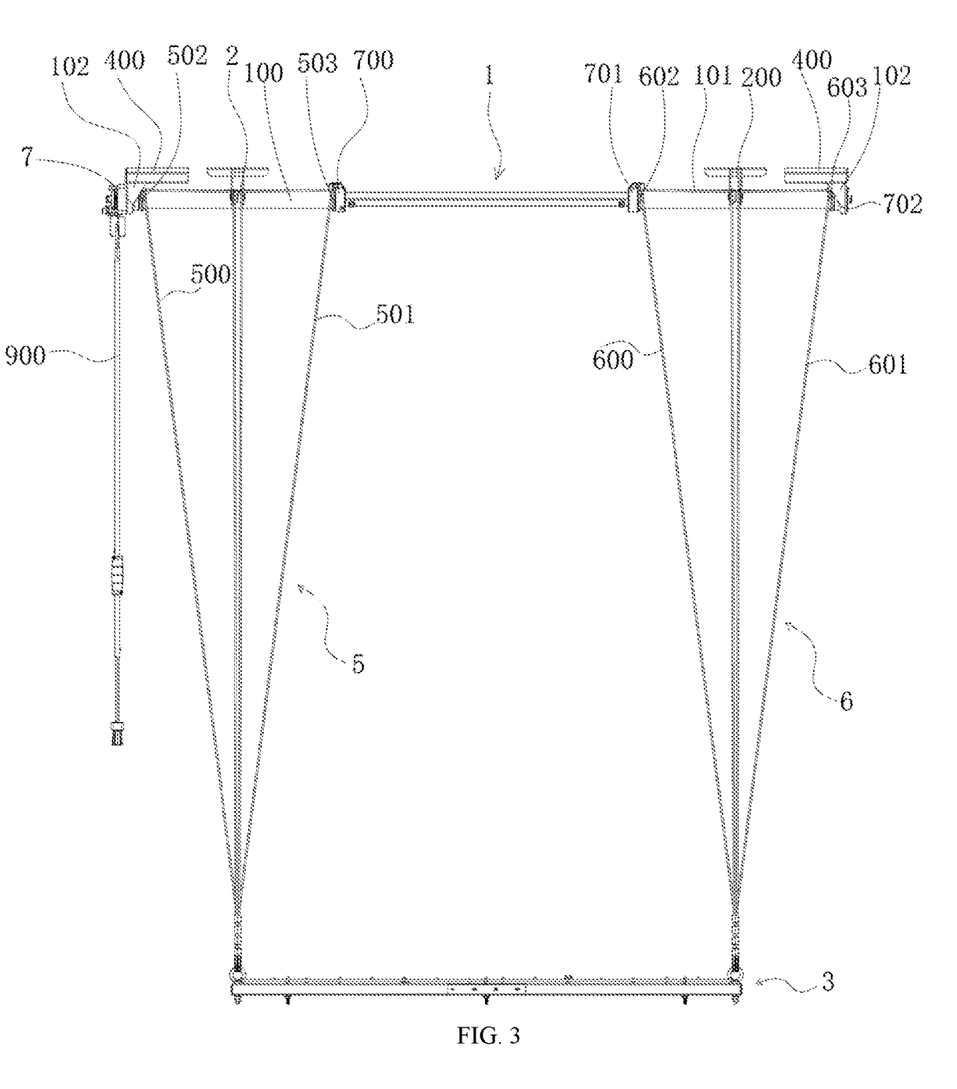
FIG. 3 is a schematic diagram illustrating a side structure of a ceiling storage rack according to some embodiments of the present disclosure.

In some embodiments, as shown in FIG. 3, the connection point of the first winding wire 500 and the second winding wire 501 with a side of the placement platform 3 close to the rotary shaft 1 is located in the middle position of the first winding portion 100; the connection point of the third winding wire 600 and the fourth winding wire 601 with a side of the placement platform 3 close to the rotary shaft 1 is located in the middle position of the second winding portion 101. Furthermore, the first pulley 2 is located in a vertical plane of a center of a connection line of the first connection point 8 and the second connection point 800 of the first winding portion 100, and the second pulley 200 is located in a vertical plane of a center of a connection line of the third connection point 801 and the fourth connection point 802 of the second winding portion 101. With this disposal, when the two winding portions perform winding or unwinding, the placement platform 3 is under stable stress and will not swing, and the transverse movement of the placement platform 3 is hardly affected by the travel of the winding wires, ensuring good stability.

In some embodiments, as shown in FIG. 1, the drive mechanism 9 is a drive gearbox connected at an end of the rotary shaft 1. A power output end of the drive gearbox is in transmission connection with the rotary shaft 1 and an input end of the drive gearbox is connected with a drive handle 900 extending downward. A gear in coaxial connection with the rotary shaft 1 is disposed in the drive gearbox, and a worm in transmission connection with the gear is rotatably connected in the drive gearbox. A lower end of the worm is connected with the drive handle 900. When the drive handle 900 is rotated, the rotary shaft 1 is rotated to realize the winding or unwinding of the two winding portions.

In other embodiments, the drive mechanism 9 may also be a drive motor. The drive motor drives through the drive gearbox the rotary shaft 1 to rotate, and the drive motor can be controlled by a hand controller and thus the two winding portions of the rotary shaft 1 can be driven to perform winding or unwinding, realizing the height adjustment to the placement platform 3.

In the descriptions of the embodiments of the present disclosure, it is noted that, in the descriptions of the present disclosure, the terms "inner", "outer" and the like indicating direction or positional relationship are based on the direction or positional relationship shown in drawings and are used only for the purpose of case of descriptions rather than indicating or implying the device or member must have a specific orientation or be constructed or operated in a specific orientation and thus these terms shall not be understood as limiting of the present disclosure. In the descriptions of the present disclosure, the descriptions by referring to the terms "one embodiment", "some embodiments" "in this embodiment", "specific example" or "some examples" or the like mean that the specific features, mechanisms, materials or characteristics described in combination with this embodiment or example are incorporated in at least one embodiment or example of the present disclosure. In this specification, the illustrative expressions of the above terms are not necessarily directed to same embodiment or example. Furthermore, the described specific features, mechanisms, materials or characteristics may be combined in an appropriate way in one or more embodiments or examples. Moreover, in a case of no conflicts, those skilled in the arts may perform combination for different embodiments or examples and the features of different embodiments or examples in the specification.

The above descriptions are only the specific embodiments of the present disclosure but the scope of protection of the present disclosure is not limited hereto. All changes or substitutions those skilled in the arts can easily conceive of within the technical scope of the present disclosure shall fall within the scope of protection of the present disclosure. Therefore, the scope of protection of the present disclosure shall be indicated by the claims.

What is claimed is:

1. A ceiling storage rack, wherein the rack comprises:
a ceiling fixing assembly;
a rotary shaft, which is rotatably connected at a side of the ceiling fixing assembly, and two winding portions rotating in synchronization with the rotary shaft are disposed at both sides of the rotary shaft comprising a first winding portion and a second winding portion;
a drive mechanism, which is used to drive the rotary shaft to rotate;
two pulleys comprising a first pulley and a second pulley, and the two pulleys are connected at another side of the ceiling fixing assembly and respectively disposed corresponding to the two winding portions;
a placement platform, disposed below the ceiling fixing assembly;
a first wire group, comprising a first winding wire and a second winding wire, and the first winding wire is connected with a first connection point of the first winding portion; a first end of the first winding wire is connected with the placement platform, and a second end of the first winding wire runs over the first pulley and then is connected with the placement platform; the second winding wire is connected with a second connection point of the first winding portion; a first end of the second winding wire is connected with the placement platform, and a second end of the second winding wire runs over the first pulley and then is connected with the placement platform;
the first connection point and the second connection point are respectively located at both ends of the first pulley to enable the first winding wire and the second winding wire to be simultaneously wound toward a center of the first winding portion or unwound from the center of the first winding portion toward both ends;
a second wire group, comprising a third winding wire and a fourth winding wire, and the third winding wire is connected with a third connection point of the second winding portion; a first end of the third winding wire is connected with the placement platform, and a second end of the third winding wire runs over the second pulley and then is connected with the placement platform; the fourth winding wire is connected with a fourth connection point of the second winding portion; a first end of the fourth winding wire is connected with the placement platform, and a second end of the fourth winding wire runs over the second pulley and then is connected with the placement platform;
the third connection point and the fourth connection point are respectively located at both ends of the second pulley to enable the third winding wire and the fourth winding wire to be simultaneously wound toward a center of the second winding portion or unwound from the center of the second winding portion toward both ends.

2. The ceiling storage rack of claim 1, wherein there is a length difference between the first winding wire and the second winding wire of the first wire group and between the third winding wire and the fourth winding wire of the second wire group to enable one of each of the two wire groups to provide a lifting capacity to the placement platform.

3. The ceiling storage rack of claim 2, wherein the length difference is set to D and the value range of the D is 10 mm≤D≤30 mm.

4. The ceiling storage rack of claim 3, wherein the length difference is 20 mm.

5. The ceiling storage rack of claim 1, wherein a first fixing buckle and a second fixing buckle are symmetrically connected at both ends of the first winding portion respectively; the first fixing buckle has a first receiving portion, and the first winding wire is pre-wound at least one turn thereby defining a first winding segment along a winding direction on the first winding portion; the first winding segment is received in the first receiving portion, and the first receiving portion forms the first connection point; the second fixing buckle has a second receiving portion; the second winding wire is pre-wound at least one turn thereby defining a second winding segment along the winding direction on the first winding portion; the second winding segment is received in the second receiving portion and the second receiving portion forms the second connection point; and
a third fixing buckle and a fourth fixing buckle are symmetrically connected at both ends of the second winding portion respectively; the third fixing buckle has a third receiving portion; the third winding wire is pre-wound at least one turn thereby defining a third winding segment along the winding direction on the second winding portion; the third winding segment is received in the third receiving portion and the third receiving portion forms the third connection point; the fourth fixing buckle has a fourth receiving portion; the fourth winding wire is pre-wound at least one turn thereby defining a fourth winding segment along the winding direction on the second winding portion; the fourth winding segment is received in the fourth receiving portion, and the fourth receiving portion forms the fourth connection point.

6. The ceiling storage rack of claim 5, wherein a first positioning structure is disposed respectively at both ends of the first winding portion, and a second positioning structure in insertion cooperation with the first positioning structure at both ends of the first winding portion is respectively disposed on an inner wall of the first fixing buckle and the second fixing buckle; the insertion cooperation of the first positioning structure and the second positioning structure is configured to limit the first fixing buckle and the second fixing buckle from circumferentially rotating relative to the first winding portion; a third positioning structure is respectively disposed at both ends of the second winding portion, and a fourth positioning structure in insertion cooperation with the third positioning structure at both ends of the second winding portion is respectively disposed on an inner wall of the third fixing buckle and the fourth fixing buckle; the insertion cooperation of the third positioning structure and the fourth positioning structure is configured to limit the third fixing buckle and the fourth fixing buckle from circumferentially rotating relative to the second winding portion.

7. The ceiling storage rack of claim 1, wherein the connection point of the first winding wire and the second winding wire with a side of the placement platform below the rotary shaft is located in the middle position of the first winding portion; the connection point of the third winding wire and the fourth winding wire with a side of the placement platform below the rotary shaft is located in the middle position of the second winding portion.

8. The ceiling storage rack of claim 7, wherein the first pulley is located in a vertical plane of a center of a connection line of the first connection point and the second connection point of the first winding portion, and the second pulley is located in a vertical plane of a center of a connection line of the third connection point and the fourth connection point of the second winding portion.

9. The ceiling storage rack of claim 1, wherein the ceiling fixing assembly comprises two mounting frames respectively configured to be connected to a ceiling and the two mounting frames are respectively located at a side of the rotary shaft; an insertion groove is disposed on the two mounting frames respectively and both ends of the rotary shaft are connected with two insertion blocks; the two insertion blocks are respectively and correspondingly inserted into the insertion grooves of the two mounting frames.

10. The ceiling storage rack of claim 1, wherein the drive mechanism is a drive gearbox connected at an end of the rotary shaft; a power output end of the drive gearbox is in transmission connection with the rotary shaft and an input end of the drive gearbox is connected with a drive handle extending downward.

\* \* \* \* \*